United States Patent
Melivilu et al.

(10) Patent No.: US 10,984,292 B2
(45) Date of Patent: Apr. 20, 2021

(54) OBJECT INFORMATION COLLECTION, CLASSIFICATION AND ANALYTICS VIA A SMART GRABBER TOOL

(71) Applicant: RUBBISH CO., Brooklyn, NY (US)

(72) Inventors: Felipe Melivilu, San Francisco, CA (US); Emin Israfil, San Francisco, CA (US); Elena Guberman, San Francisco, CA (US)

(73) Assignee: RUBBISH CO., Brooklyn, NY (US)

( * ) Notice: Subject to any disclaimer, the term of this patent is extended or adjusted under 35 U.S.C. 154(b) by 71 days.

(21) Appl. No.: 16/545,840

(22) Filed: Aug. 20, 2019

(65) Prior Publication Data

US 2020/0057922 A1     Feb. 20, 2020

Related U.S. Application Data

(60) Provisional application No. 62/719,998, filed on Aug. 20, 2018.

(51) Int. Cl.
  *G06K 9/62*     (2006.01)
  *G06K 9/22*     (2006.01)
  *G06K 9/00*     (2006.01)
  *H04N 5/232*    (2006.01)

(52) U.S. Cl.
  CPC ....... *G06K 9/6267* (2013.01); *G06K 9/00664* (2013.01); *G06K 9/228* (2013.01); *H04N 5/232* (2013.01)

(58) Field of Classification Search
  CPC ..................................................... H04N 5/232
  See application file for complete search history.

(56) References Cited

U.S. PATENT DOCUMENTS

| 9,525,967 | B2 | 12/2016 | Mamlyuk | |
| 2018/0126553 | A1* | 5/2018 | Corkum | B25J 9/1697 |
| 2018/0194008 | A1* | 7/2018 | Namiki | G06T 7/80 |
| 2019/0365499 | A1* | 12/2019 | Nagao | A61B 90/361 |

OTHER PUBLICATIONS

OpenLitterMap on the Internet at <URL: https://openlittermap.com/en>; retrieved from the Internet on Aug. 20, 2019.

(Continued)

*Primary Examiner* — Edward Park
(74) *Attorney, Agent, or Firm* — Schwabe Williamson & Wyatt, PC

(57) ABSTRACT

A system for object and information collection comprises a handheld tool to grab the object. The handheld tool comprises a pole with a handle, a trigger, a grabber mechanism at an opposite end, and a logic system attached to the pole, wherein once a user actuates the trigger to pick up an object with the grabber mechanism, the logic system transmits a capture signal to initiate a classification event. A classification application executing on a processor is responsive to receiving the capture signal from the logic system to capture information associated with the object and assign an object classification to the object based at least in part the captured information. At least one of a portion of the information and the assigned object classification is transmitted over network to an analytics cloud service to perform data aggregation and analysis.

25 Claims, 7 Drawing Sheets

(56) References Cited

OTHER PUBLICATIONS

Clear Streets LA on the Internet at <URL: http://cleanstreetsla.com/cleanstat>; retrieved from the Internet on Aug. 20, 2019.
Litterati on the Internet at <URL: https://www.litterati.org/>; retrieved from the Internet on Aug. 20, 2019.
SeeClickFix on the Internet at <URL: https://seeclickfix.com/>; retrieved from the Internet on Aug. 20, 2019.

* cited by examiner

510

520

OBJECT INFORMATION COLLECTION, CLASSIFICATION AND ANALYTICS VIA A SMART GRABBER TOOL

CROSS-REFERENCE TO RELATED APPLICATIONS

This application claims the benefit of provisional Patent Application Ser. No. 62/719,998, filed Aug. 20, 2018, assigned to the assignee of the present application, and incorporated herein by reference.

BACKGROUND

The United Nations in 2009 and the International Organization for Migration in 2015 estimated that around 3 million people are moving to cities every week. Approximately 54% of people worldwide now live in cities, up from 30% in 1950. Sources estimate this will grow to ⅔ of world population in the next 15-30 years. The report also estimates that by 2030, the world could have 43 megacities with more than 10 million inhabitants, up from 31 today. These swelling populations will place extra demands on both resources and services in urban areas.

The World Bank estimates a global waste growth by 70 percent by 2050 as urbanization and populations rise. According to the report, the rise in rubbish may reach 3,500,000,000 tons by 2050 from 2,000,000,000 tons in 2016. The report also noted that while more than a third of waste globally ends up in landfill, over 90 percent is dumped openly in lower income countries that often lack adequate disposal and treatment facilities. Adequate financing for collection and disposal is one of the biggest issues for cities that often struggle to cover the costs of providing waste services. For example, local businesses typical cover 80% of the costs. Both people and corporations would like to help solve this problem, but do not know how.

BRIEF SUMMARY

The exemplary embodiments provide methods and systems for object and information collection. Aspects of the embodiments include a handheld tool to grab the object, wherein the handheld tool comprises a pole, a handle, a trigger, a grabber mechanism, and a logic system attached to the pole. Once a user actuates the trigger to pick up an object with the grabber mechanism, the logic system transmits a capture signal to initiate a classification event. A classification application executing on a processor is responsive to receiving the capture signal from the logic system to capture information associated with the object and assign an object classification to the object based at least in part the captured information. At least one of a portion of the information and the assigned object classification is transmitted over network to an analytics cloud service to perform data aggregation and analysis.

According to the method and system disclosed herein, the handheld tool and the classification application may be used by community members to track and improve litter collection in urban areas to make neighborhoods cleaner, safer and more sustainable.

DETAILED DESCRIPTION

Methods and systems for object information collection, classification and analytics via a smart grabber tool are disclosed. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Believing that everyone should live in a healthy and sustainable community, the disclosed embodiments provide a system and method for object and information capture and classification. More particularly, the system includes a handheld grabber tool that helps a user pick up litter and an accompanying application that classifies the litter in response to trigger activation on the tool. The classification process may also include capturing a photograph of the litter and metadata (e.g. date, time and location). The tool and the application may be used by community members to track and improve litter collection in urban areas to make neighborhoods cleaner, safer and more sustainable.

Figure 1:
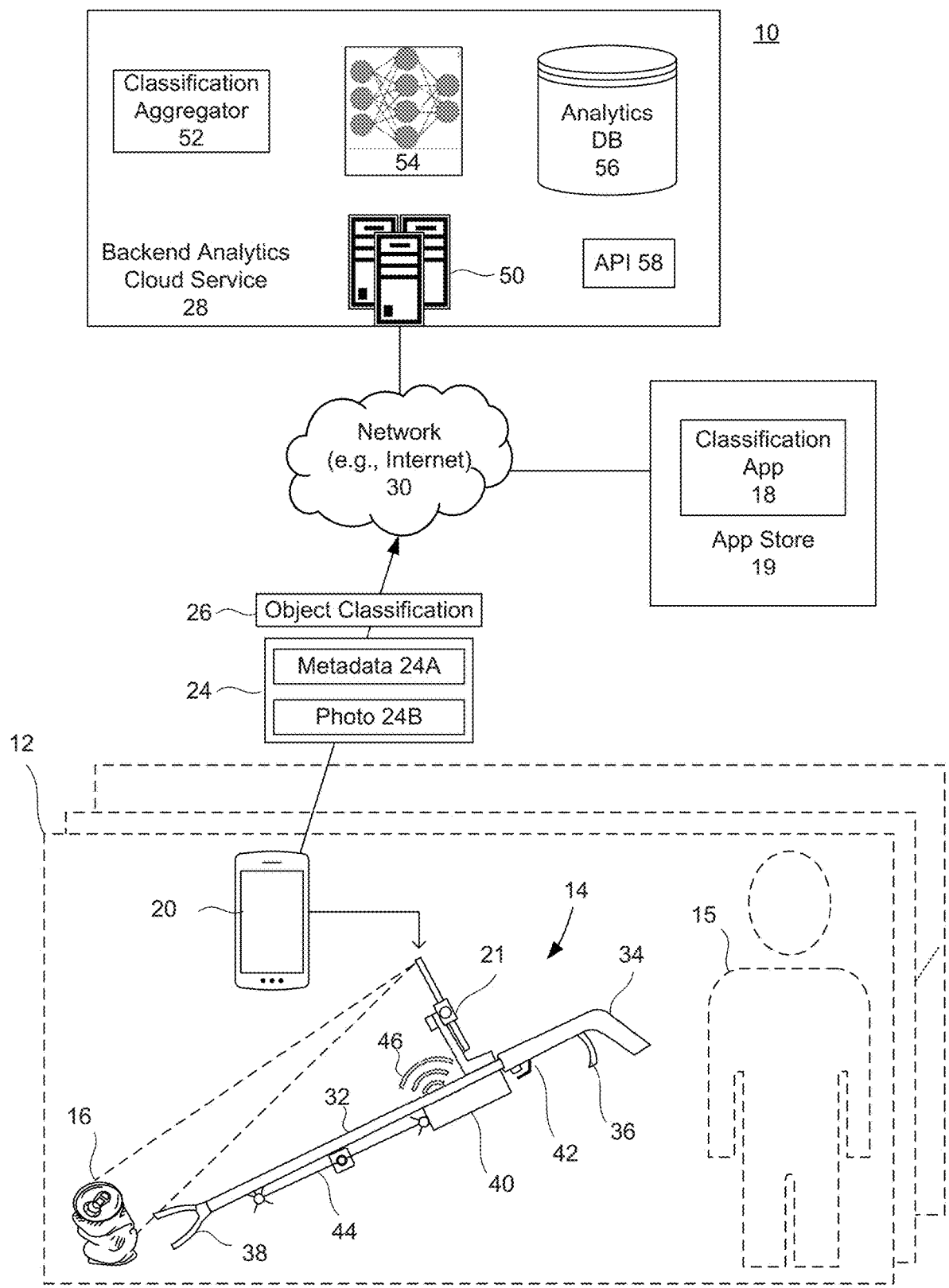
FIG. 1 is a diagram illustrating one embodiment of an object information collection, classification and analytics system via a smart grabber tool.

FIG. 1 is a diagram illustrating one embodiment of an object information collection, classification and analytics system via a smart grabber tool. The object information collection, classification and analytics system 10 (hereinafter system 10) facilitates crowd-sourced object pick up and information collection. In some embodiments, the system 10 includes a plurality of user systems 12 that each comprise a handheld grabber tool 14 (or simply handheld tool 14) operated by a user 15 to pick up objects 16 in a particular location, such as a neighborhood. As used herein, the term "object" relates generally to litter or rubbish, but may apply to other types of objects to be picked up and disposed of/collected. In another embodiment, the term "object" may relate to stationary objects in a neighborhood that can't be picked up and discarded, but rather require repair by a city or municipality.

The handheld tool 14 works in conjunction with a classification application 18 (or app 18) that is integrated into the handheld tool 14 or is executed on a mobile device 20. In one embodiment, the classification app 18 is available for download to the mobile device 20 from an app store 19. The mobile device 20 may be optionally mounted to the handheld tool 14 via a mount 21. In response to a signal from the handheld tool 14 when the handheld tool 14 picks up the object 16, the classification application 18 collects information 24 about the object 16, assigns an object classification 26 to the object 16, and may communicate the information 24 and an object classification 26 to a backend analytics cloud service 28 over a network (e.g., Internet) 30 for tracking and reporting purposes.

The handheld tool 14 is a modular system comprising a pole 32 with a handle 34, a trigger 36, and a grabber mechanism 38. In the example configuration shown, the trigger 36 may be located on the handle on one end of the pole 32 and the grabber mechanism 38 may be at an opposite end. However, in other embodiments, the trigger 36 may be adjacent or near the grabber mechanism 38. According to the disclosed embodiments, further attachments to the pole 32 may include a logic system 40, a switch 42 coupled to the trigger 36, and/or configurable lighting 44 to facilitate nighttime use.

In operation, once a user squeezes or actuates the trigger 36 to pick up the object 16 with the grabber mechanism 38, the switch 42 sends a trigger signal (not shown) to the logic system 40 to transmit a capture signal 46 to the classification app 18 to initiate a classification event. The classification app 18 executing on a processor of the logic system 40 or the mobile device 20 is configured to receive the capture signal 46, capture the information 24 associated with the object 16 and assign an object classification 26 to the object 16 based at least in part captured the information 24.

In one embodiment, the information 24 collected by the classification app 18 may include metadata 24A related to the object 16. An example of metadata 24A may include at least global positioning system (GPS) location data, and date and time of the information capture. Metadata 24A may further include information about the user.

In embodiments, the information 24 collected may also include a photo 24B of the object 16 captured in response to the classification app 18 receiving the capture signal 46. In the embodiment where the classification application 18 runs on the mobile device 20, a camera integrated with the mobile device 20 may be used to capture the photo 24B. However, in the embodiment where the classification application 18 is runs on the logic system 40, the camera may be integrated with the logic system 40 so that use of a mobile device 20 is unnecessary.

In one embodiment, the classification app 18 may automatically determine and assign the object classification 26 to the object 16 based on the captured information 24. For example, a machine learning component (not shown) in the classification app 18 may analyze the photo 24B and optionally the metadata 24A to identify and classify the type of object collected. Example classifications could be tobacco, plastic, cans, food, paper, and the like. In another embodiment, other types of classifications may be made even without picking up an object. For example, the classification app 18 can be used to capture photos of graffiti, pot holes, broken street equipment, hazardous materials, drug paraphernalia, homeless encampments, tree issues, street stains, and the like, classify the photos as such, and send the photos 24B, metadata 24A and the object classifications 26 to the backend analytics cloud service 28.

In another embodiment, the classification application 18 assigns the object classification 26 to the object 16 based on manual input of the user 15. The manual input of the user 15 may be made through at least one of a button on the logic system 40, a selection made on a user interface of the classification application 18 displayed on the mobile device 20, and voice input. In an alternative embodiment, the user interface of classification application 18 may be displayed on a display device that is integrated with the logic system 40.

Once the object classification 26 is assigned to the object 16, the classification app 18 transmits at least one of a portion of the information 24 and the assigned object classification 26 over the network 30 to the backend analytics cloud service 28 to perform data aggregation and analysis.

In one embodiment, the backend analytics cloud service 28 comprises one or more servers 50, a classification aggregator 52 a machine learning component 54 and an analytics database 56.

The servers 50 of backend analytics cloud service 28 receive the information 24 and the object classifications 26 collected by a plurality of user systems 12 to compile collection analytics and statistics. Examples of the collection analytics and statistics may include, for example, i) the number of objects/litter picked up and classified within one minute (liter per minute (LPM)) by each user 15, ii) the number of objects/litter picked up within one meter, and the like. Using the classification aggregator 52 and the machine learning component 54, the backend analytics cloud service 28 may create in-depth analytics from the data gathered from many user systems 12. Both the pickup statistics and analytics may be stored in the analytics database 56.

The backend analytics cloud service 28 may also provide and API 58 for third-party integration, and provide an administrative portal or dashboard for companies using the backend analytics cloud service 28 for professional use. For example, a company such as Zillow can use pickup statistics and analytics from the analytics database 56 to show users how a neighborhood is changing or show users if a house is on the cleanest street in the neighborhood. Or a company such as Yelp can use the pickup statistics and analytics to show if a business supports local street cleaning efforts or if the business is in a less than clean area. Businesses can then be ranked accordingly.

The backend analytics cloud service 28 may display the statistics and analytics statistics to the users 15 through the classification app 18 or via a website to directly enable the users 15 to improve their neighborhoods by displaying user pickup activity, and informing the users 15 how to improve their neighborhoods by identifying areas that need improvement.

Figure 2:
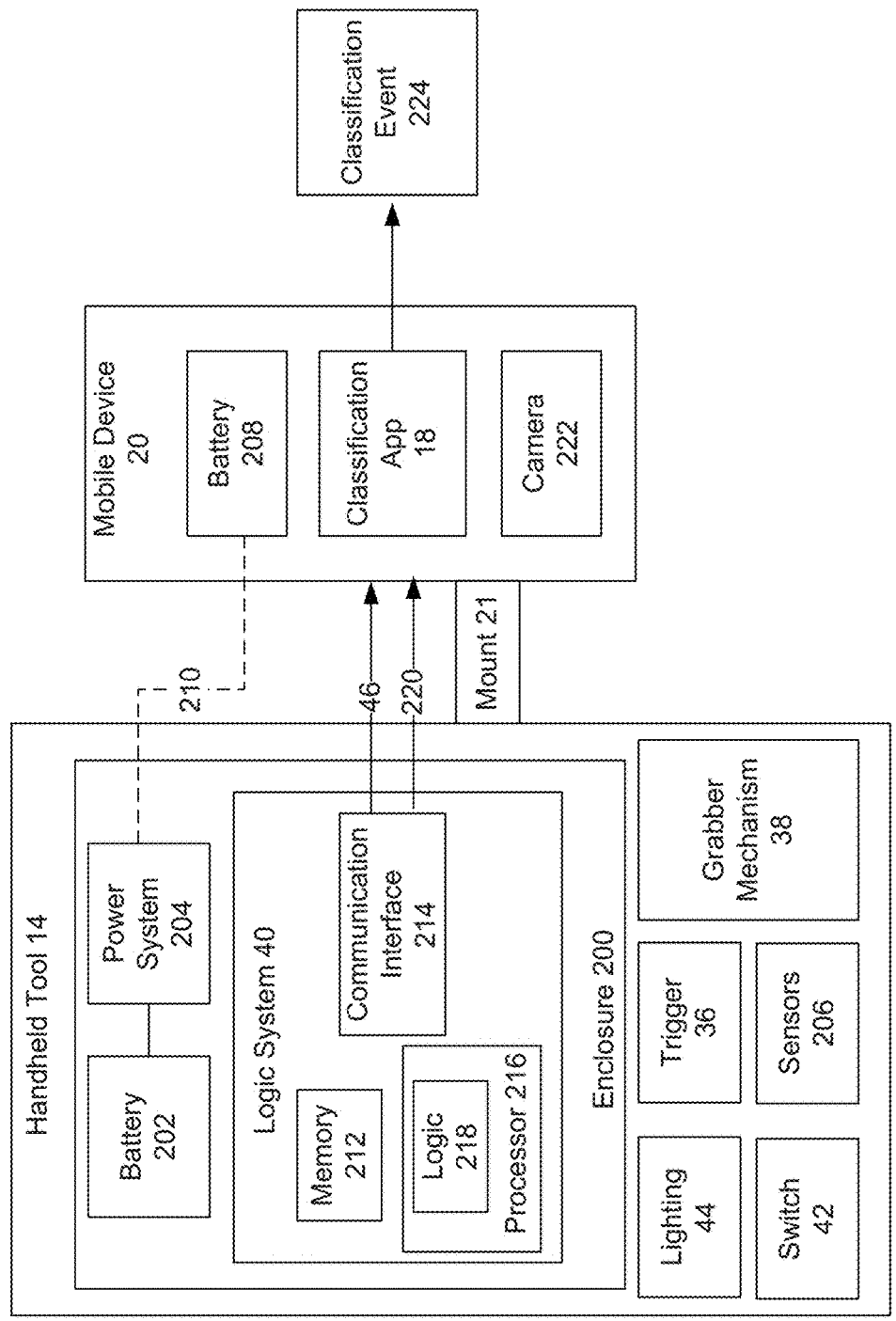
FIG. 2 is a block diagram illustrating components of the object information collection, classification and analytics system in further detail.

FIG. 2 is a block diagram illustrating components of the object information collection, classification and analytics system 10 in further detail, where like components from FIG. 1 have like reference numerals. In one embodiment, the handheld tool 14 includes an enclosure 200 housing a battery 202, a power system 204 and the logic system 40. Other components of the handheld tool 14 include the configurable lighting 44, the trigger 36, the switch 42, the grabber mechanism 38, and optional sensors 206. According to one embodiment, the power system 204 may distribute power from battery 202 to other electrical components such as the logic system 40, lighting 44, switch 42 and the sensors 206, but also to a battery 208 of the mobile device 20 via a power cable 210 for extended litter pickups. The mobile device 20 may be optionally mounted to the handheld tool 14 by a mount 21, or alternative carried by the user 15.

The logic system 40 includes a memory 212, a communication interface 214, and a processor 214 that executes logic 216. In one embodiment, the logic 216 receives input from the switch 42 and controls the communication interface 214. The logic 216 may also control the lighting 44 and the sensors 206. Processing may begin once the user pulls the trigger 36, which activates the grabber mechanism 38 to pick up the object 16, and the switch 42 to send the trigger signal to the logic 218 executing on the processor 216.

Although the handheld tool 14 is described as being implemented with a grabber-type reaching tool, other types of reaching tools may be used that have different types of grabber mechanisms 38, such as multiple metal jaws, rubber cups, a magnetic pickup, a spear for stabbing objects, a net for pickups in water, and the like. In addition, the pole 32 (shown in FIG. 1) of the handheld tool 14 may be extendable or telescopic. As used herein, the trigger 36 and switch 42 are intended to cover alternative implementations. For example, assume the grabber mechanism 38 is implemented as a spear attached to the pole 32. The trigger 36 and switch 42 may be implemented as a pushbutton actuator in which spearing the object 16 pushes the spear into the pushbutton actuator, which causes transmission of the capture signal 46.

Processing by the logic 218 may begin when the trigger signal is received from the switch 42 in response to actuation of the trigger 36 or other electromechanical transducer. The logic 218, in turn actuates the communication interface 214 to transmit the capture signal 46 to the classification application 18 running on the mobile device 20. The communication interface 214 may represent any type of wired or wireless communication. Example types of wireless communication include Bluetooth, ZigBee, Wi-Fi, WiMAX, cellular, and the like. The logic 218 may prevent the transmission of another capture signal 46 for collection of another data point until the triggering mechanism has been reset. It should be noted that the communication interface 214 is bidirectional. That is, the logic system 30 sends the capture signal 46 to the classification application 18 on the mobile device 20, while the classification application 18 can send a request to the logic system 40 to receive battery 202 life information and/or to activate/change the configurable lighting 44 (e.g., color, intensity and the like). In one embodiment, the classification application 18 can control the configurable lighting 44 in response to events including, picking up over a certain number of pieces of litter, entering a new neighborhood, or joining with other users on a cleanup.

The logic 218 may also collect sensor data 220 from the sensors 206 and transmit the sensor data 220 to the classification application 18 as part of the metadata 24A (FIG. 1). The sensor data 220 may be used to aid classifying the object 16. Example types of sensors 206 that may be used to classify the object 16 may include, an altimeter, a pressure sensor, a barometer, a thermometer, a microphone to capture noise levels, and an air pollution sensor to determine air quality, and the like.

The capture signal 46 transmitted by the mobile device 20 prompts the classification application 18 to capture a data point such as by activating the camera 222 on the mobile device 20 to snap a photo of the captured object 16, including metadata 24A for a classification event 224. Sensor data 220 may also be received as well.

The mobile device 20 may be implemented as any type of portable computing device including a smartphone, a tablet computer, a wearable device such as a smartwatch, or a device built from a platform such as Arduino, Rasberry Pi, and the like. As is well known, the mobile device 20 and the servers 50 include hardware components of typical computing devices (not shown), including a processor, input devices (e.g., keyboard, pointing device, microphone for voice commands, buttons, touchscreen, etc.), and output devices (e.g., a display device, speakers, and the like). The mobile device 20 and the servers 50 may further include computer-readable media, e.g., memory and storage devices (e.g., flash memory, hard drive, optical disk drive, magnetic disk drive, and the like) containing computer instructions that implement the functionality disclosed when executed by the processor. The mobile device 20 and servers 50 may further include wired or wireless network communication interfaces for communication.

Although the classification application 18 and logic 218 are shown as separate components, the functionality of each may be combined into a lesser or greater number of modules/components. For example, in the embodiment where the classification application 18 is run on the processor 216 of the logic system 40, the functionality of the logic 218 may be included in the function of the classification application 18.

Figure 3:
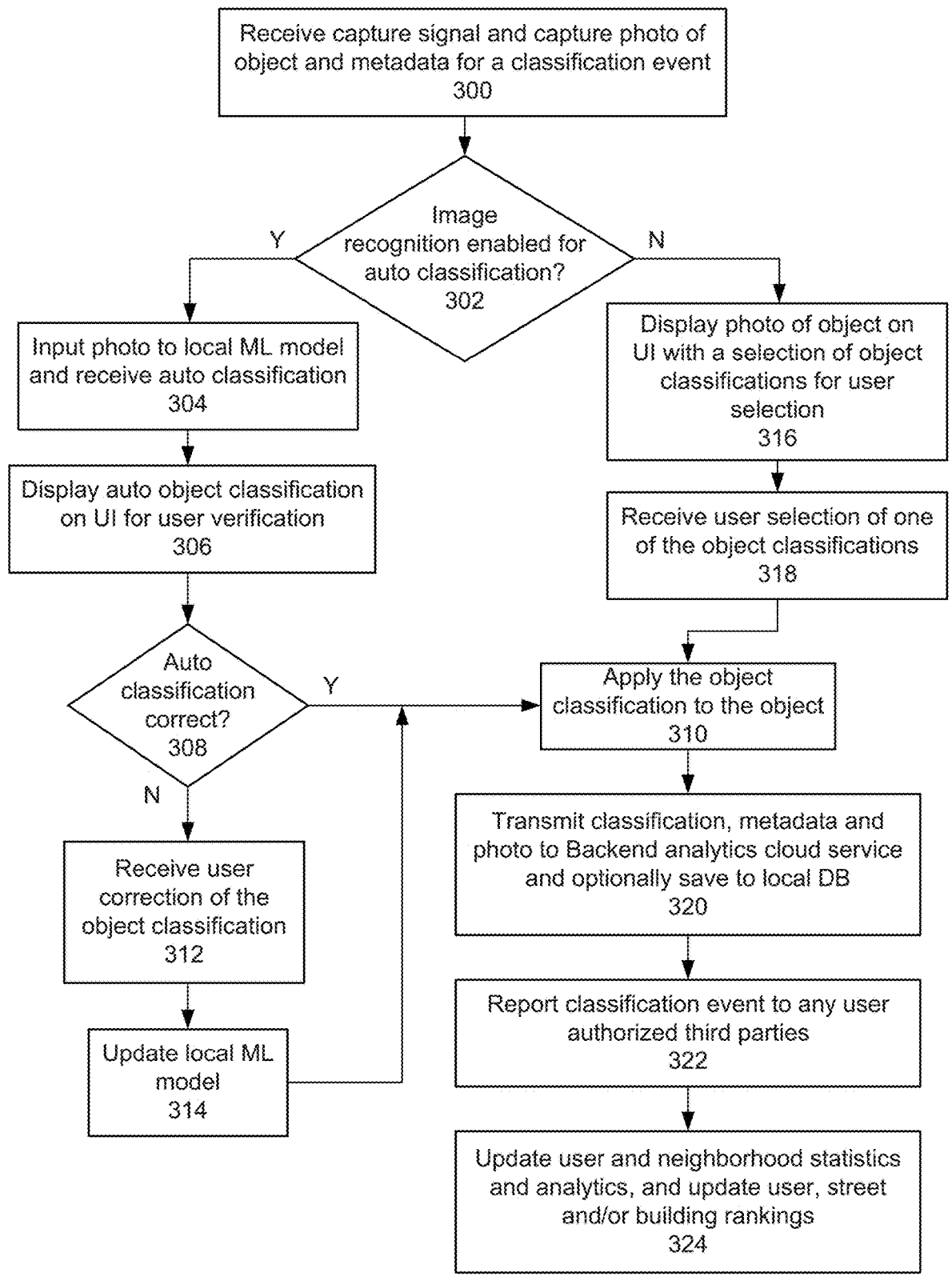
FIG. 3 illustrates a flow diagram illustrating the processing of the classification application in further detail.

FIG. 3 illustrates a flow diagram illustrating the processing of the classification application 18 in further detail. The classification application 18 allows users to improve their community by identifying areas that there is that need improvement or by directly improving the neighborhood and tracking user's litter pickup activity. The classification application 18 has three main functions: allow users to tag areas for neighborhood improvement, allow users to keep track of their own activity as well as activity of a network of users, and redeem rewards for their contributions. The classification application can perform these functions independently of the handheld tool 14, however, the handheld tool 14 facilitates easier pickup.

The process may begin once the classification application 18 receives the capture signal 46, and in response, activates the camera 222 on the mobile device 20 to capture a photo of the object 16 for a classification event 224 (block 300). The classification application 18 determines if image recognition is enabled for automatic classification (block 302). If so, the classification application 18 inputs the photo to a machine learning (ML) model stored locally on the mobile device and receives an automatic object classification in response (block 304). The object classification is displayed on a UI of the classification application 18 for user verification (block 306). It is then determined if the user verified that the object classification is correct (block 308). If the user verified that the object classification is correct, then the object classification is applied to the object (block 310).

If it is determined that the user indicated the object classification is incorrect (block 308), then the user correction of the classification is received (block 312), and the local ML model is updated (block 314). The process then continues with applying the corrected object classification to the object (block 310).

Responsive to the classification application 18 determining that image recognition is not enabled for automatic classification (block 302), the captured photo of the object is displayed on the UI with a selection of object classifications for user selection (block 316).

Figure 4:
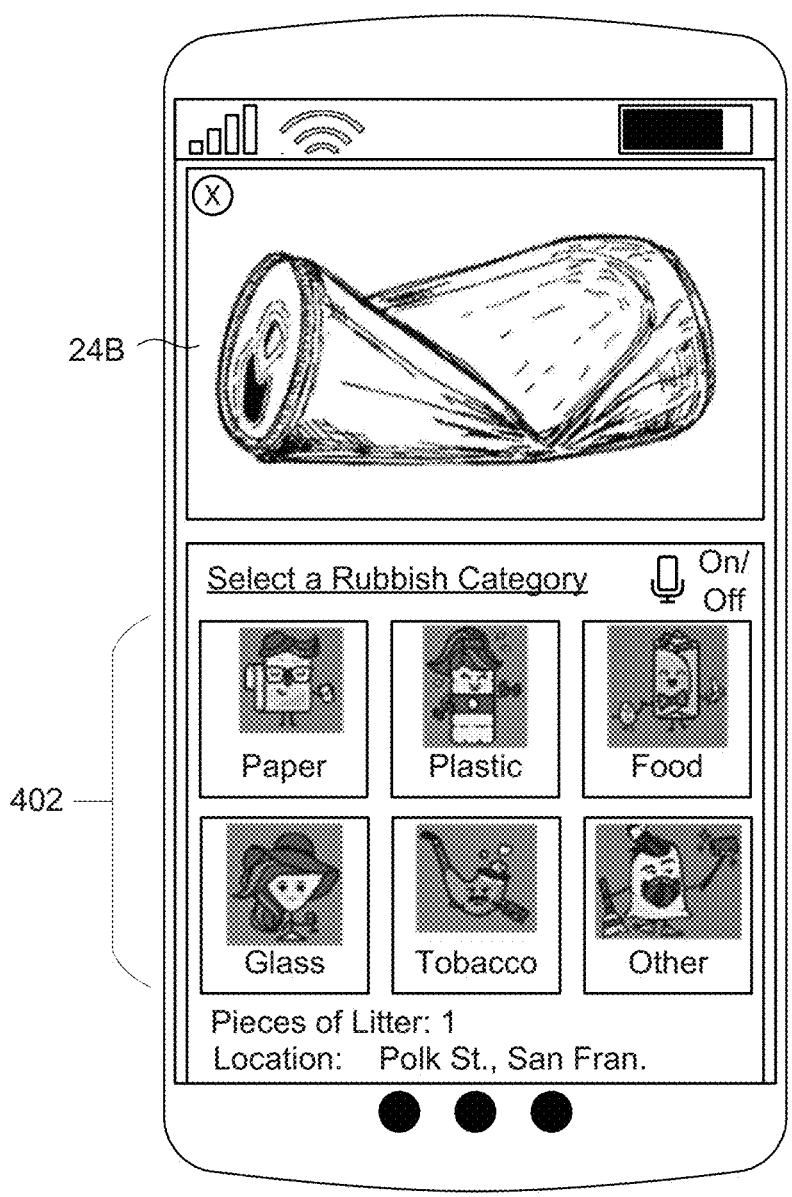
FIG. 4 illustrates an example user interface of the classification application that displays types of object classifications for user selection.

FIG. 4 illustrates an example user interface 400 of the classification application 18 that displays types of object classifications 26 for user selection. In one embodiment, the user interface (UI) 400 displays the photo 24B taken of the captured object 16 and a plurality of icons 402 of various types of object classifications. In this particular example, the icons represent paper, plastic, food, glass, tobacco, and other. The user taps one of the icons to indicate the correct object classification of the object, and the classification application 18 assigns the selected object classification 26 to the object 16. In another embodiment, during a classification event 220, the classification application 18 can prompt the user to select the object classification via a remote button or through vocal input entered in the U 1400.

Referring again to FIG. 3, the classification application 18 receives the user selection of one of the object classifications (block 318), and applies the selected object classification to the object (block 310).

Once the object classification has been applied to the object, the classification application 18 transmits the classification event to the backend analytics cloud service 28 in the form of the object classification 26, the metadata 24A and the photo 24B, and optionally saves the information to a local database (block 320).

The classification event may also be reported to any user or authorized third parties by either the classification application 18 or the backend analytics cloud service 28 (block 322). For example, photos and metadata can be sent to relevant local services, such as furniture pickup for item too heavy to pick up, a hazardous pickup service for hazardous waste, or to local Business Improvement Districts to make them aware of an issue.

Responsive to receipt of the classification event, the backend analyst cloud service 28 updates user and neighborhood statistics and analytics and updates user, street and/or building rankings (block 324). Once the user and neighborhood statistics and analytics are updated, the user may view the analytics for the classification event as well as a history of classification events to the UI 400 of the classification application 18, or via a web webpage displayed by backend analytics cloud service 28.

Figure 5A:
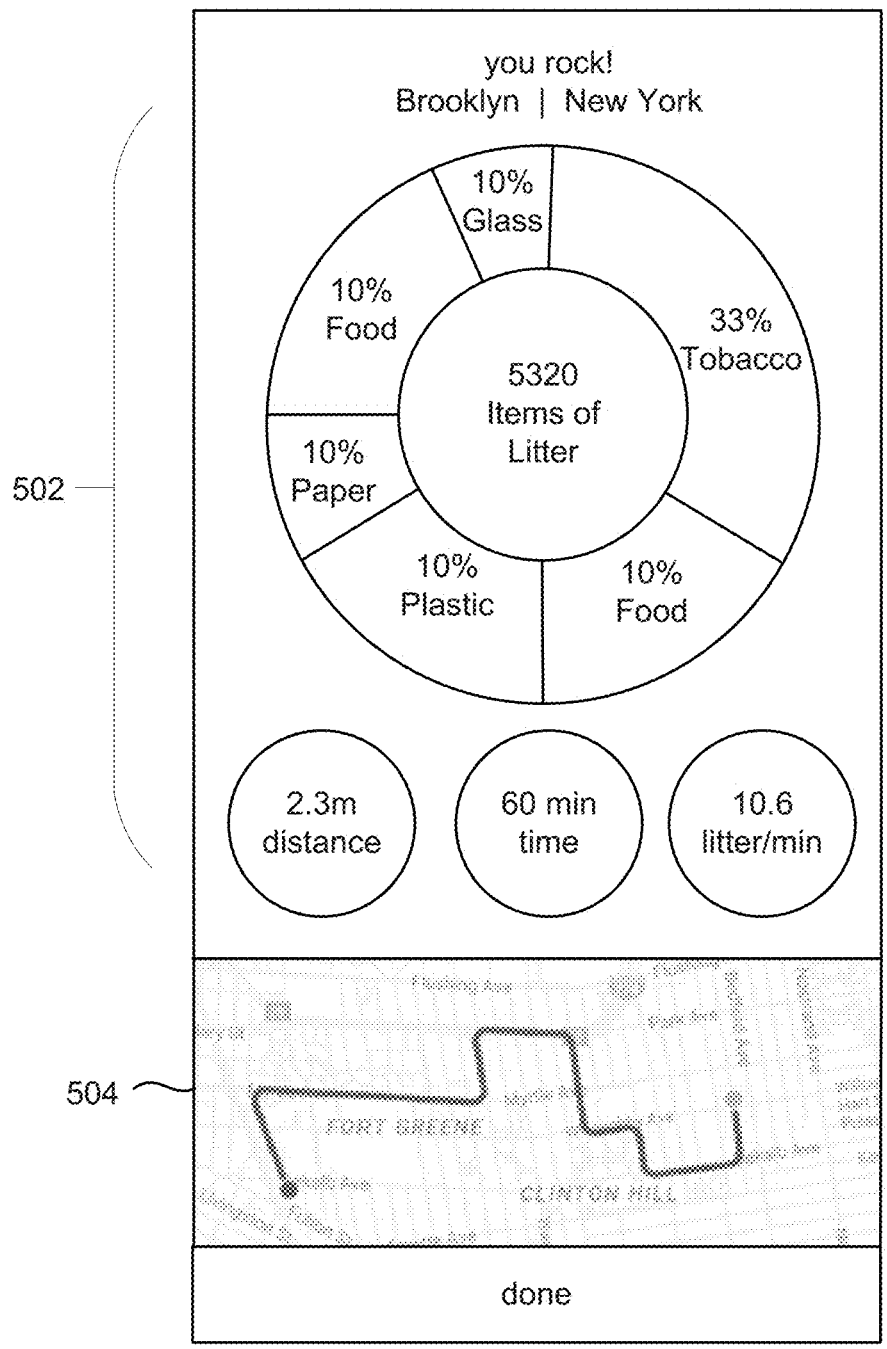
FIGS. 5A, 5B and 5C illustrate examples of a UI screen displaying statistics of the user's litter pickup activity.
Figure 5B:
Figure 5C:
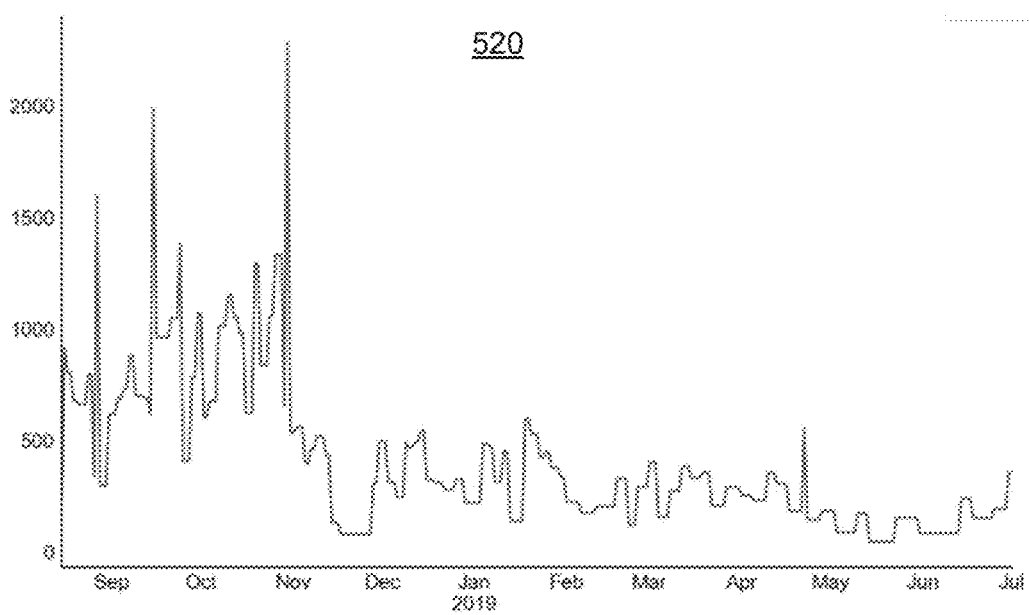

FIGS. 5A, 5B and 5C illustrate examples of a UI screen 500 displaying statistics of the user's litter pickup activity. In one embodiment, the UI 500 may display a graphic 502 showing a percentage of each type of object classification picked up by the user during a litter pickup session (i.e., a classification event), the distance traveled, time duration and litter/min. The UI 500 may also display a map 504 showing the route the user took during the litter pickup session.

FIG. 5B shows an example UI screen 510 displaying statistics and analytics for a particular category of litter, which in this example it tobacco, specifically cigarettes. Examples statistics and analytics that may be displayed are the number cigarettes diverted, the number of packs of cigarettes diverted, the time spent picking up cigarettes, the reduction in cigarette litter in the area, and the estimated money saved in litter abatement costs. FIG. 5C shows an example UI screen 520 displaying a graph of the impact litter collection has in reducing litter amounts in a designated area over a range of time.

Other features of the classification application 18 may include an option for the user as to tag litter and mark the litter is picked up or not picked up. In addition to tagging litter, users can report other areas of improvement such as graffiti, potholes or other neighborhood alerts. In the embodiment where the classification application 18 includes the ability to automatically categorize objects being collected or reported, uses have the option of adding custom tags to train the local ML model, using ML platforms such as CoreML for iOS by Apple Inc®. In a further embodiment, the ML model may be trained to read text from photos to identify street names, merchant names, brand names and recycling types. Finally, the classification application 18 may optionally track health information like steps, heart rate, a distance traveled by the user. The classification application 18 may integrate into Apple's HealthKit so that a pickup session can be recorded as exercise.

In addition to cleanup activities, the classification application 18 may be configured to support sponsorship by merchants/companies whereby a merchant/company can sponsor a local cleanup in a defined area in exchange for money or local services such as a cup of coffee. Similarly, the classification application 18 may be configured to allow individuals or groups to search for and join other users in a cleanup and/or hire users for other shared neighborhood services, such as window cleaning, snow removal, neighborhood watch and the like.

Referring again to FIG. 1, the backend analytics cloud service 28 may use public data and data submitted by users to track pickup activity and show relative cleanliness of streets, buildings and neighborhoods. Pickup activity data may be used for any combination of: i) track efficacy of cleanup efforts by comparing how pieces of litter were collected in the same area over time; ii) automatically create a cleanliness map of streets; iii) make recommendations for where public fixtures should be located such as trash cans, ashcans, benches, planners, and the like; iv) measurement recommendations for more effective street cleaning practices; v) measure impact of installed or planned public fixtures; vi) measure litter impact of public holidays, events, and construction in a community (e.g., see FIG. 5C); vii) find and predict how changes in litter have an effect on the traffic, social media ratings (e.g., Yelp), real estate prices, business income and safety; and viii) measure efficacy of ashcans/trash cans.

Figure 6:
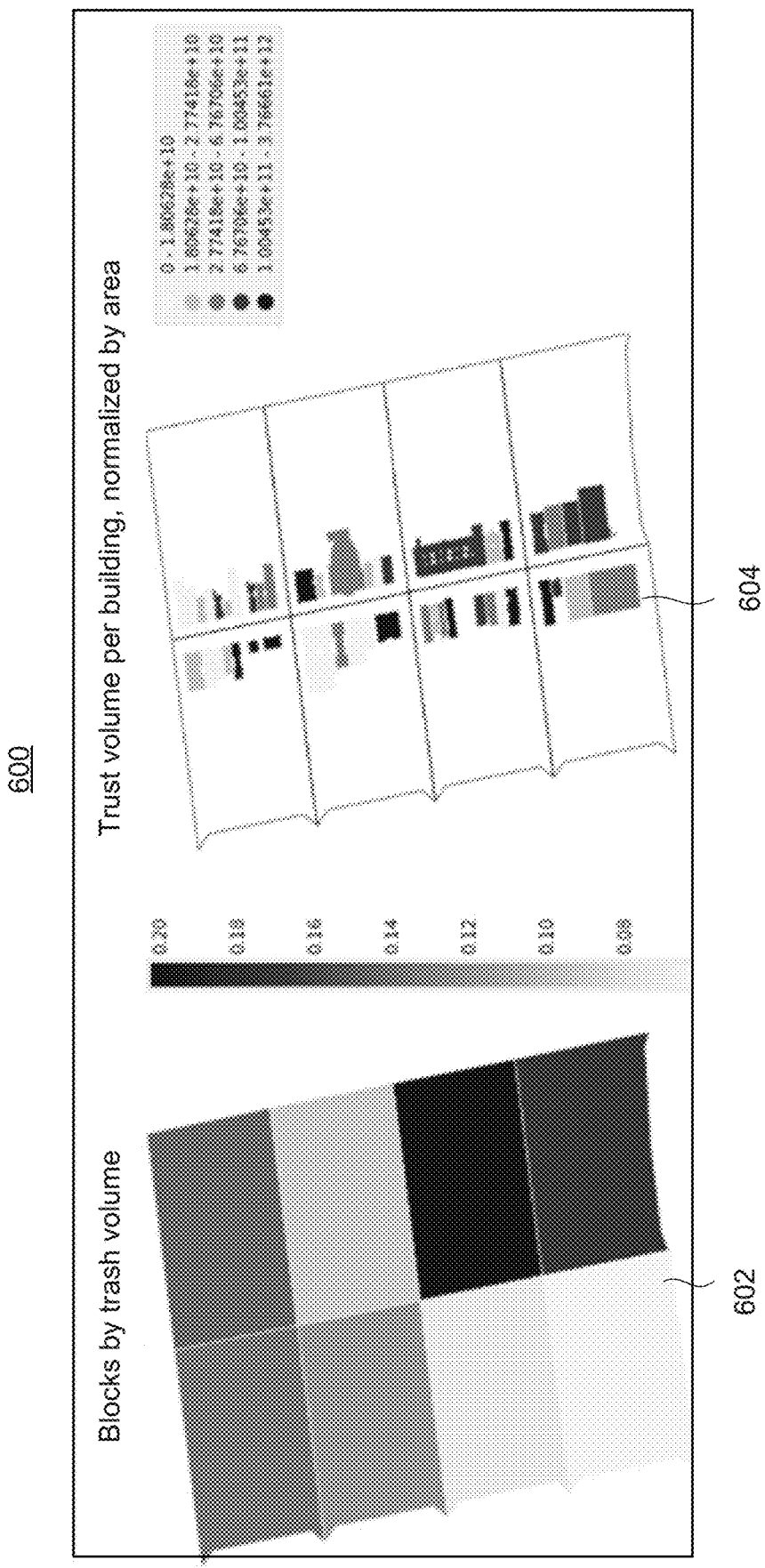
FIG. 6 illustrates an example UI screen showing one method for comparing/ranking the cleanliness of buildings and/or streets.

FIG. 6 illustrates an example UI screen 600 showing one method for comparing/ranking the cleanliness of buildings and/or streets. The example is based on tracked cigarettes, but the graphics are applicable to showing the impact of any type of litter pickup. The first graphic 602 represents blocks in a neighborhood colored coded by trash volume, where darker colors corresponds to higher trash volume. The second graphic 604 represents trash volume within buildings in those blocks, also coded by colors.

In one embodiment, the pickup statistics and analytics may be displayed via dashboard. The dashboard may allow the management of groups of users to: i) view their activity such as time spent or amount of litter picked up; ii) react to user reports and dispatch resources to problem areas; iii) view all pickup events in an area over a specified time; iv) view local heat maps and trends; and v) allocate funds to local users to cleanup or engage in another community improvement activities. An example of trends includes consumer consumption trends. The backend recommendation cloud service can then make recommend targeted advertising. For example, assume a bunch of cigarettes are picked up and classified on Polk Street/Filbert. The backend recommendation cloud service can then automatically recommend placing an MRI/Anti-smoking campaign add in that location.

A method and system for object information collection, classification and analytics via a smart grabber tool has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A system for object and information collection, comprising:
   a handheld tool to grab the object, the handheld tool comprising:
      a pole with a handle, a trigger, and a grabber mechanism; and
      a logic system attached to the pole, wherein once a user actuates the trigger to pick up the object with the grabber mechanism, the logic system transmits a capture signal to initiate a classification event; and
   a classification application executing on a processor responsive to receiving the capture signal from the logic system to:
      capture information associated with the object and assigning an object classification to the object based at least in part the captured information; and
      transmit at least one of a portion of the information and the assigned object classification over network to an analytics cloud service to perform data aggregation and analysis.

2. The system of claim 1, wherein the information associated with the object includes metadata.

3. The system of claim 2, wherein the metadata comprises global positioning system (GPS) location data and date and time of the information capture.

4. The system of claim 2, wherein the information associated with the object includes data from one or sensors including: an altimeter, a pressure sensor, a barometer, a thermometer, a microphone, and an air pollution sensor.

5. The system of claim 2, wherein the information associated with the object includes a photo captured by a camera, wherein once the classification application receives the capture signal, the classification application causes the camera to automatically capture the photo and the metadata.

6. The system of claim 5, wherein the camera is integrated with the logic system and the classification application is executed by the logic system.

7. The system of claim 5, wherein the camera is integrated within a mobile device that is mounted on the handheld tool, and wherein the classification application is executed on the mobile device.

8. The system of claim 1, wherein the classification application automatically determines and assigns the object classification to the object based on the captured information associated with the object.

9. The system of claim 1, wherein the classification application assigns the object classification to the object based on manual input of a user.

10. The system of claim 9, wherein the manual input of the user is made through at least one of a button on the logic system, a selection made on a user interface of the classification application, and voice input.

11. The system of claim 1, further comprising a switch coupled to the trigger, wherein once a user squeezes the trigger to pick up the object, the switch sends a trigger signal to the logic system to transmit the capture signal.

12. The system of claim 11, wherein the logic system limits the trigger to one object pickup and information capture per trigger actuation until the trigger is reset.

13. The system of claim 1, wherein the logic system further comprises: a battery, a memory, and a transmitter to transmit the capture signal.

14. The system of claim 13, wherein the information and the assigned classification are stored in the memory and subsequently transmitted to the analytics cloud service via an external device.

15. An executable software product stored on a non-transitory computer-readable medium containing program instructions for object and information collection, the program instructions for, receiving a capture signal from a handheld tool, wherein the handheld tool comprises a pole with a handle, a trigger, a grabber mechanism, and a logic system attached to the pole, wherein once a user actuates the trigger to pick up the object with the grabber mechanism, the logic system transmits the capture signal to initiate a classification event; capturing information associated with the object and assigning an object classification to the object based at least in part the captured information; and transmitting at least one of a portion of the information and the assigned object classification over network to an analytics cloud service to perform data aggregation and analysis.

16. The executable software product of claim 15, wherein the program instructions are executed on the logic system.

17. The executable software product of claim 15, wherein the program instructions are executed on a mobile device.

18. The executable software product of claim 15, wherein the program instructions automatically determine and assign the object classification to the object based on the captured information associated with the object.

19. The executable software product of claim 15, wherein the program instructions assign the object classification to the object based on manual input of a user.

20. The executable software product of claim 19, wherein the manual input of the user is made through at least one of a button on the logic system, a selection made on a user interface displayed by the program instructions, and voice input.

21. The executable software product of claim 15, wherein the program instructions store the information and the assigned classification in a memory and subsequently transmit the information and the assigned classification to the analytics cloud service via an external device.

22. A method for object and information collection, comprising:
   receiving a capture signal from a handheld tool, wherein the handheld tool comprises a pole with a handle, a trigger, a grabber mechanism, and a logic system attached to the pole, wherein once a user actuates the trigger to pick up an object with the grabber mechanism, the logic system transmits the capture signal to initiate a classification event;
   capturing information associated with the object and assigning an object classification to the object based at least in part the captured information; and
   transmitting at least one of a portion of the information and the assigned object classification over network to an analytics cloud service to perform data aggregation and analysis.

23. The method of claim 22, further comprising: using, by the analytics cloud service, public data and data submitted by users to track pickup activity and show relative cleanliness of streets, buildings and neighborhoods.

24. The method of claim 22, further comprising: using, by the analytics cloud service, pickup activity for any combination of:

i) track efficacy of cleanup efforts by comparing how pieces of litter were collected in the same area over time;
ii) automatically create a cleanliness map of streets;
iii) make recommendations for where public fixtures should be located;
iv) measurement recommendations for more effective street cleaning practices;
v) measure impact of installed or planned public fixtures;
vi) measure litter impact of at least one of public holidays, events, and construction in a community;
vii) find and predict how changes in litter have an effect on at least one of traffic, social media ratings, real estate prices, business income and safety; and
viii) measure efficacy of ashcans/trash cans.

25. The method of claim 22, further comprising: providing, by the analytics cloud service, a dashboard that allows users to perform at least one of:
i) view their activity such as time spent or amount of litter picked up;
ii) react to user reports and dispatch resources to problem areas;
iii) view pickup events in an area over a specified time;
iv) view local heat maps and trends; and
v) allocate funds to local users to cleanup or engage in another community improvement activities.

* * * * *